Oct. 11, 1966   W. L. FAUST ET AL   3,278,858
OPTICAL MASER EMPLOYING MULTIPLE GASES
Filed Nov. 13, 1962   2 Sheets-Sheet 1

ENERGY LEVELS OF XENON

INVENTORS W. L. FAUST
R. A. McFARLANE
C. K. N. PATEL
BY WILLIAM R. BENNETT, JR.
David P. Kelley
ATTORNEY

United States Patent Office 3,278,858
Patented Oct. 11, 1966

3,278,858
OPTICAL MASER EMPLOYING MULTIPLE GASES
Walter L. Faust, Chatham, and Ross A. McFarlane and Chandra K. N. Patel, Summit, N.J., and William R. Bennett, Jr., New Haven, Conn., assignors to Bell Telephone Laboratories, Incorporated, New York, N.Y., a corporation of New York
Filed Nov. 13, 1962, Ser. No. 237,271
3 Claims. (Cl. 331—94.5)

This invention relates to optical masers and, more particularly, to optical masers employing gaseous active media.

The recent development of coherent light amplifiers and oscillators, now generally referred to as "optical masers" or "lasers" has made feasible a host of new uses and applications of electromagnetic wave energy in the optical portion of the spectrum. Light waves produced by such devices can be very sharply focused to produce energy densities suitable for welding, cutting, drilling and similar purposes. Furthermore, the high degree of monochromaticity obtainable from an optical maser makes it a useful tool for spectroscopic investigations as well as for stimulating various types of chemical and physical reactions. Among the most promising applications of coherent light are those in the field of communications where the optical spectrum represents virtually unlimited bandwidth and information carrying capacity. In addition, the directionality of optical maser beams greatly mitigates many problems of interference and security of communications channels.

For communications as well as other purposes it is advantageous to have optical masers operable at many different wavelengths in the light spectrum, which is deemed to include infrared, visible and ultraviolet energy. As the wavelength emitted by any particular energy transition in a laser medium is tunable only over a small portion of the spectrum, it is important to provide a number of materials adapted for use as active laser media at various light frequencies. A great amount of research has recently been directed to the discovery of such materials and a number, particularly in the solid state, have been found. Furthermore, especially for communications use, it is important that laser media be provided which are adapted to continuous wave operation. In general, such media are those characterized by three or more energy levels, at least two of which are optically connected. Low noise, a further communications requirement, is a feature which, due to the complex structure and emission characteristics of solids, appears more readily achievable with gaseous optical masers.

For communications and other applications in which an optical maser beam is to be directed over a long transmission path through the atmosphere, the optical absorption characteristics of oxygen, nitrogen, carbon dioxide, water vapor and other atmospheric components must be considered. In the near infrared portion of the spectrum, for example, where many recently developed optical masers operate, the atmosphere tends to be a very lossy transmission medium. There are, however, a number of "windows" or spectral regions where the infrared losses are relatively low. It is highly desirable to have available optical masers for producing coherent radiation at wavelengths corresponding to such transparent atmospheric windows.

Another desideratum of optical masers is high specific gain. Many of the recently developed gaseous lasers produce relatively low gain—of the order of ten to fifteen percent per meter. While this is sufficient to produce oscillation in a tube of reasonable length, nonregenerative amplification may require very long tubes or complex optical apparatus for folding a long optical path into a short space without permitting spurious interactions among light rays traversing different parts. For amplification purposes, then, high specific gain is considered especially advantageous.

In order for a material to be useful as a negative temperature medium in an optical maser, it is essential that it be "pumpable," i.e., that there be some way of increasing the population of the upper level of a specified optically connected pair of energy levels, designated the signal transition, to the point where it exceeds the population of the lower level of the pair. Coherent emission is then obtained by stimulating the transition of excited atoms to the lower energy state.

One pumping technique which has proven useful in the case of certain gaseous laser media is electron bombardment. Optical maser action has been produced by this means in the noble gases helium, neon, argon, krypton and xenon. In a typical noble gas laser, the noble gas atoms are excited by collisions with free electrons in a gaseous discharge. In order for a population inversion to result from electron-atom collisions, it is essential that the active gas have at least one well populated energy state with a large cross section for excitation to the upper level of the signal transition or to a higher level which relaxes or decays thereto. It is also necessary that various competing effects produced by the interaction of electrons with the gas be maintained at a relatively low level. Thus, pumping of gas lasers by electron-atom collisions places rather stringent limitations on the energy level structure of the active gas. In some cases, moreover, special measures must be taken to inhibit simultaneously occurring interactions which compete with the desired one.

The selectivity of excitation in a gaseous discharge may be enhanced by mixing the active gas with an auxiliary gas which has a metastable energy state matching the upper maser level. The auxiliary gas is then excited to its metastable state and, through resonant interaction in inelastic atom-atom collisions, the excitation is transferred to the active gas. This process, disclosed in copending application Serial No. 816,276, filed May 27, 1959, assigned to the assignee hereof and now abandoned, by Ali Javan, made possible the first gaseous optical maser. In a variation of the technique, the auxiliary gas serves to populate a metastable state of the active gas which has a large cross section for excitation by an additional process to a desired upper level. Although the atom-atom collision process is applicable to all combinations of gases which satisfy the particular energy level criteria, the number of such combinations is limited by the close coincidence required of the energy levels between which the excitation transfer occurs. It appears that the number of such coincidences is insufficient to cover all parts of the light spectrum as is desired.

An object of this invention is the generation and amplification of coherent wave energy in the optical portion of the electromagnetic spectrum.

Another object of this invention is to facilitate the generation and amplification of coherent light by means of optical masers employing gaseous active media.

It is also an object of this invention to facilitate the generation and amplification of coherent electromagnetic radiation in the infrared portion of the spectrum and especially in portions corresponding to atmospheric windows.

A further object of the invention is an optical maser capable of producing high specific gain.

These and other objects of the invention are achieved in a specific illustrative embodiment thereof comprising means forming an enclosed space for containing a gaseous optical maser medium, and means defining an infrared light beam path through the enclosed space. Means are also provided for pumping the gaseous medium with an electric discharge.

It is a feature of the invention that the gaseous active medium comprises a mixture of an active gas with a large excess of an auxiliary gas having a higher ionization potential than the active gas and having all of its metastable energy states disposed to prevent energy transfer therefrom to the active gas. A mixture of xenon as the active gas and helium as the auxiliary gas has proven particularly advantageous.

The above mentioned as well as other objects and features of the invention will be thoroughly understood from the following discussion, taken in conjunction with the accompanying drawing in which:

FIG. 1 is a diagram of a portion of the energy level system of xenon;

FIG. 2 ilustrates the energy distribution of electrons in a gaseous discharge under varying conditions;

Figure 1:
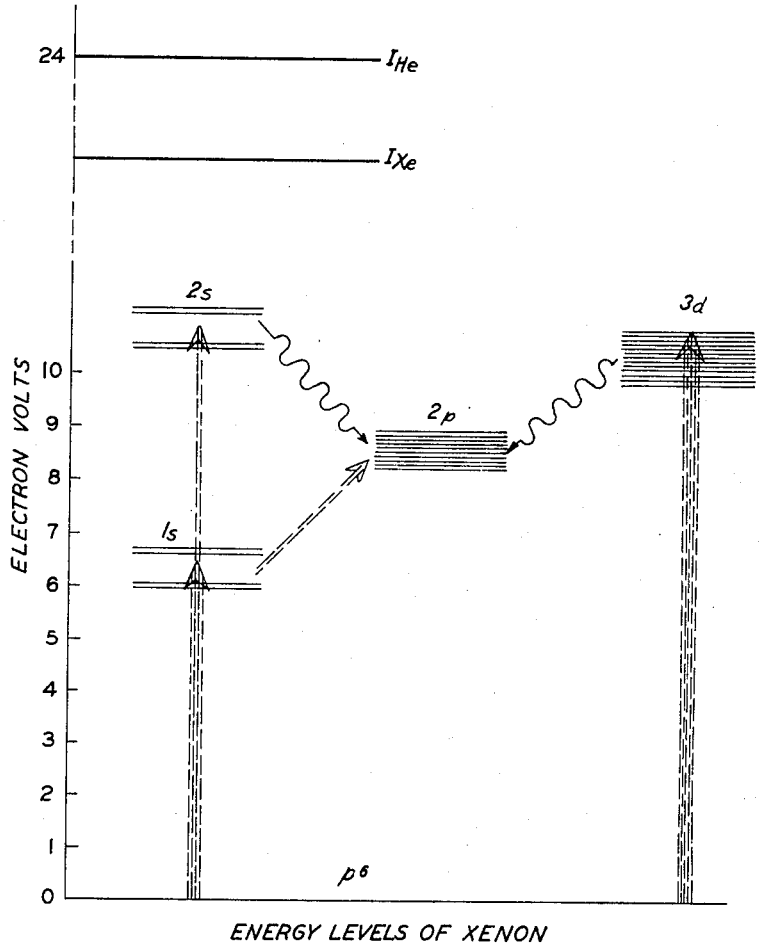

Referring now to the drawing, there is shown in FIG. 1 a portion of the energy level structure of xenon which advantageously is employed as the active gas of the invention. The structure of xenon is similar to that of other gases which may be utilized, such as krypton and radon. Optical maser action in pure xenon is reported in Physical Review Letters, volume 9, page 102. In the pure gas, xenon atoms are bombarded by electrons in a direct current or radio frequency discharge, thereby exciting them from the $(p)^6$ to the $1s$, $2s$ and $3d$ states. (Unless otherwise stated, energy levels are designated herein by the Paschen notation.) The transition from the $(p)^6$ ground state to the $2p$ levels is not allowed by the selection rules governing quantum phenomena, while the $s$ and $d$ levels have relatively large electron excitation cross sections. At very low pressures the latter are strongly coupled to the ground state, but in the optical maser the xenon pressure is adjusted so that photons emitted by atoms decaying from the excited states to the ground state are trapped. That is, the density of atoms is such that there is a virtually one hundred per cent probability that a photon emitted by a relaxing atom will be absorbed by another atom before escaping from the medium. The $s$ and $d$ states are thus metastable.

By adjusting the gas pressure to cause resonance trapping of radiation from the $2s$ and $3d$ states, it is possible to invert the populations of these levels with respect to the $2p$ states. In pure xenon, optical maser action has previously been observed at $2.0261\mu$, representing the $3d$–$2p$ transition. These levels are readily inverted by pumping with an ordinary direct current or radio frequency discharge. For reasons enumerated in the introductory portion of this specification, however, it is desirable to produce population inversions of the greatest possible magnitude and at a variety of different wavelengths. In xenon, for example, it is desirable to produce population inversions between the entire $s$ and $p$ configurations and between the entire $d$ and $p$ configurations. Stimulated emission would then be possible at more than twenty wavelengths in the range between 1 and 13 microns. It will be shown that a number of these emission lines occur at atmospheric windows, making them particularly advantageous for communications purposes.

In order to achieve the desired result it is necessary to increase drastically the number of active gas atoms excited to the upper maser levels. The normal energy distribution of electrons in a gaseous discharge is roughly as illustrated by the solid curve of FIG. 2. As shown, the peak of the distribution is in the range from 6 to 8 electron volts. This means that the peak intensity of the discharge is spread over the energy region which roughly coincides with the $1s$ levels of xenon. The $3d$ and $2s$ levels, on the other hand, lie at about 10 to 11 volts. Much of the energy in the discharge, therefore, is wasted when the free electrons collide with ground state atoms and excite them to the $1s$ states which have relatively long lifetimes. In addition, a significant number of free electrons collide with atoms in the $1s$ state, thereby raising them to the $2p$ states. This populates the lower maser level, resulting in a decrease in the magnitude of the inversion. Additionally absorption of free electrons at one energy results in a decrease in the total number at the higher energy end of the distribution. Gain is therefore limited on those emission lines on which stimulated emission is produced, and no inversions at all are produced on other weaker transitions.

In order to invert more of the uper levels it is necessary to provide a discharge with more electrons having energies more nearly coinciding with the energy thereof. At first glance it appears this can be accomplished by increasing the intensity of the discharge. While this does result in an increase of electrons with the desired energies, it also increases the numbers of electrons with all other energies. This is so because in an ordinary discharge the number of atoms ionized is relatively small. Any increase in the discharge intensity simply ionizes a greater number, thereby raising the distribution curve, as indicated by the heavy dashed curve of FIG. 2, without appreciably shifting the peak to higher energies. The magnitude of the increase is greatest at the peak and drops off at higher and lower energies. As a result of the increase in the 6 to 8 volt range, excitation of the $1s$ levels and consequent population of the $2p$ states becomes a still more serious problem.

Figure 2:
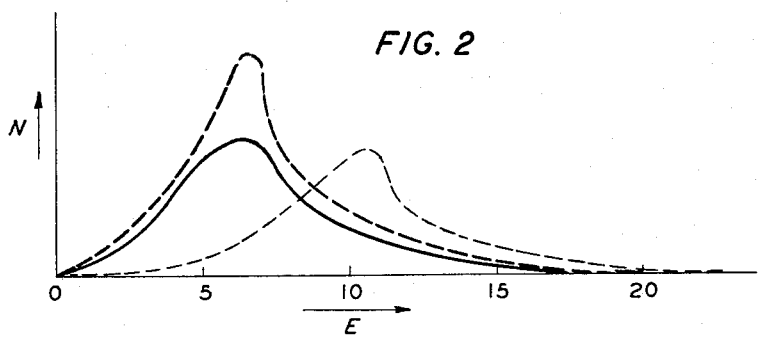

Shifting the distribution peak to higher energies, as indicated by the lighter dashed curve of FIG. 2, corresponds to an increase in the electron temperature of the discharge. It can be seen that the number of electrons at higher energies is increased, while the number at lower energies may actually decrease if the intensity of the discharge is unchanged. The result is more effective excitation of the upper maser levels, and less undesirable excitation of the lower levels of the transition.

In accordance with the principles of the invention the electron temperature of the gaseous discharge is increased by adding to the active gas a large excess of an auxiliary gas having a higher ionization potential than the active gas and having all of its metastable energy states disposed to prevent energy transfer therefrom to the active gas. In most gases the metastable states occur relatively near the ionization potential, with few such states at lower energies. Particles of such a gas absorb litle energy from the discharge at levels which are of importance for exciting the active gas. However, they act in a manner analogous to a buffer gas, reducing the collision rate of electrons with active gas atoms. An auxiliary gas suitable for use with the heavier noble gases is helium. A typical ratio of helium to xenon, or to krypton, in an optical maser of the invention is about 200:1. Significant effects are possible with ratios as low as 50:1. The addition of helium in such concentration to xenon has produced an enormous increase in the gain observed at $2.026\mu$, and has resulted in a substantial increase in the brightness of several emission lines in krypton.

Because helium has a very high ionization potential and has no metastable energy states below about 18.9 electron volts, its effect in the invention is to lengthen the time during which a free electron in the discharge can interact with the energizing field and gain energy therefrom. In contrast, the ionization potential of xenon is 12.13 volts. An overwhelming proportion of the collisions between free electrons and helium atoms are elastic; the energy of each particle remains unchanged. Since there are many more helium than xenon atoms in the gaseous mixture, the lifetime of the electrons between collisions with xenon atoms is relatively long. Thus, more of the electrons acquire higher energies from the field and the peak of the distribution curve is shifted to the right as indicated by the lighter dashed curve of FIG. 2. The addition of a great excess of an auxiliary gas, such as helium, which has a higher ionization potential than the active gas is therefore an effective way to increase the electron temperature of the discharge.

Figure 3:
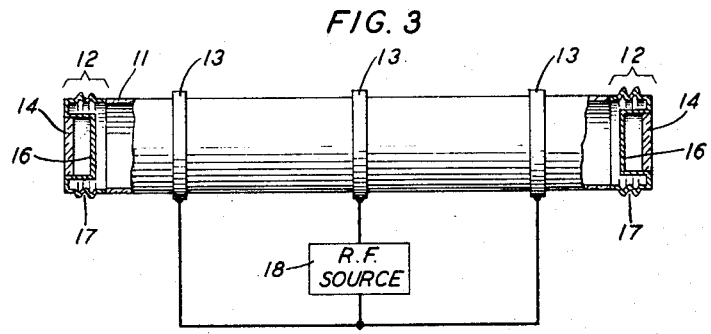
FIG. 3 depicts one form of an optical maser embodying the invention.

FIG. 3 depicts a typical optical maser embodying the invention and comprising an elongated quartz or glass tube 11 having end assemblies 12 shown in cross section for clarity. The tube 11 and the end assemblies 12 define a chamber for containing a gaseous optical maser medium as disclosed herein. Three ring electrodes 13 encircle the tube 11 and are connected to a radio frequency source 18 for producing a radio frequency discharge in the gaseous medium. When the device is to be used as an oscillator the end assemblies 12 may include transparent windows 14 and reflectors 16 defining an optical cavity resonator. The reflectors may be omitted if the optical maser is to be used for amplification. Flexible metal bellows 17 permit adjustment of the optical components mounted on the end assemblies 12.

It has become a general practice in prior art gaseous optical masers to place the reflectors outside the gas tube, the ends of which are then provided with Brewster angle windows to reduce reflections. External mirrors are considered advantageous because they are easily adjustable and replaceable. Furthermore, they do not contaminate the gaseous medium nor are they attacked by the discharge. However, as the gas tubes and windows are normally of quartz or Pyrex glass, they introduce rather severe losses at infrared wavelengths, especially beyond about $2.6\mu$. Because optical maser oscillation requires that the gain per passage of the light beam through the medium exceeds the losses, no wavelengths longer than about $2.7\mu$ have been produced by such devices.

Many of the energy level pairs which can be inverted by the high temperature electron discharge in a gaseous medium of the invention correspond to wavelengths longer than those previously observed. Because of the infrared absorption characteristics of ordinary optical components, the full capabilities of the invention are only realized when the elements defining the light beam path through the laser medium are adapted to function at infrared wavelengths beyond about $2.2\mu$. Thus, the reflectors 16 may advantageously comprise a layer of silver deposited on polycrystalline zinc sulfide. Silver has a uniformly high reflectivity beyond $2\mu$, so that a great range of wavelengths can be produced without changing mirrors. This substrate material is known for its infrared transparency. One of the silver reflectors 16 is partially transmissive to permit abstraction of output energy.

Figure 4:
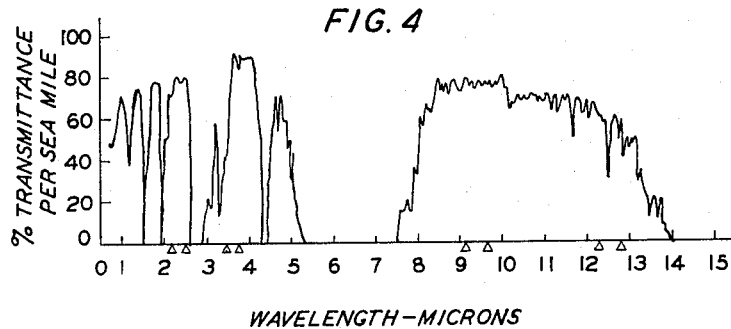
FIG. 4 is a curve representing the transmittance of the atmosphere in the infrared range.

An optical maser in accordance with the invention has been operated with an active medium consisting of helium and xenon mixed in ratios ranging from 100 to 250:1. Oscillation has been achieved at seventeen different wavelengths between $2\mu$ and $13\mu$. Several of these emission lines have never been observed before, and a number are very strong. The oscillating lines of the $P_{3/2}$ parent ion are listed in Table I, with the energy level transition designated in Racah notation, and an estimate of emission intensity. (Several lines of the $P_{1/2}$ parent ion have also been observed as well as some mixed transitions.) Asterisks indicate lines not observed heretofore, while wavelengths coinciding with atmospheric windows are underlined. The latter are also marked on the abscissa of FIG. 4 which is a plot of the atmospheric transmittance in the infrared.

TABLE 1

| Wavelength (Microns) | Transition (Racah Notation) | Intensity (Approx.) |
| --- | --- | --- |
| 2.0268 | 5d [1½]₁⁰—6p [1½]₁ | Very strong. |
| 2.3200 | 5d [2½]₂⁰—6p [2½]₂ | Very weak. |
| 2.6276 | 5d [2½]₂⁰—6p [2½]₂ | Strong. |
| 2.6518 | 5d [1½]₁⁰—6p [0½]₀ | Do. |
| 3.1078 | 5d [2½]₃⁰—6p [1½]₂ | Very weak. |
| 3.3676 | 5d [2½]₂⁰—6p [1½]₁ | Strong. |
| 3.5080 | 5d [3½]₃⁰—6p [2½]₂ | Very strong. |
| 3.6798 | 5d [0½]₁⁰—6p [0½]₁ | Weak. |
| 3.6859 | 5d [2½]₂⁰—6p [1½]₂ | Strong. |
| 3.8950 | 5d [3½]₃⁰—6p [2½]₂ | Very weak. |
| 3.9966* | 5d [0½]₀⁰—6p [0½]₁ | Strong. |
| 5.5754* | 5d [3½]₄⁰—6p [2½]₃ | Very strong. |
| 7.3167* | 5d [1½]₂⁰—6p [1½]₁ | Medium. |
| 9.0065* | 5d [1½]₁⁰—6p [1½]₂ | Strong. |
| 9.7029 | 5d [0½]₁⁰—6p [1½]₁ | Do. |
| 12.266 | 5d [0½]₀⁰—6p [1½]₁ | Medium. |
| 12.917 | 5d [0½]₁⁰—6p [1½]₂ | Strong. |

The techniques of the invention have enabled very high gain to be produced in a gaseous optical maser medium. In a 100:1 mixture of helium and xenon at a pressure of four millimeters Hg, for example, gain of 4.5 decibels per meter has been measured. This is to be compared with the ten to fifteen percent gain previously measured in gaseous media. Such high gain enables the invention to operate advantageously as a nonregenerative amplifier, with the light beam traversing the active medium but once. The light beam path in this device need be defined only by infrared transparent windows. Alternatively, an oscillator in the usual form may be constructed with a very short optical cavity resonator. In fact, the gas tube need be no more than two inches long.

At longer wavelengths the diffraction losses from a small diameter optical resonator become significant. A typical gas tube may have an inside diameter of five millimeters. In order to reduce diffraction losses, however, a larger diameter is desirable. Unfortunately, it has also been found that the gain varies roughly inversely as the diameter of the tube. Any decrease in the gain can be offset by using a longer light beam path through the discharge. Although longer tubes cause difficulty with mirror alignments at shorter wavelengths, the far infrared wavelengths are so large that the degree of structural precision required is much less. With the high gain of the invention, diffraction losses are no longer a critical factor at some wavelengths.

Although the invention has been described with particular reference to specific illustrative embodiments, many variations are possible. For example, the invention is not only applicable to helium-xenon lasers but may be employed with other gases as well. Helium is considered a particularly advantageous auxiliary gas because of its very high ionization of 24 volts potential and the absence of metastable states below 18.9 volts. The addition of helium to krypton has produced noticeable increases in the brightness of some emission lines. The upper maser levels of argon and neon, however, are of somewhat higher energy. As a result, the ionization potential of helium is relatively not high enough to produce a useful effect even when the auxiliary gas is present in great excess. On the other hand, the upper levels of radon are even lower than those of xenon so that a correspondingly greater effect is possible. The heavier atom also implies a narrower emission line and hence more gain. Although complex gases, such as some organic gases, may have higher ionization potentials than helium, their spectra are typically characterized by absorption bands which may interfere with the emission lines of the active gas. However, such auxiliary gases may be utilized if they have no strong absorption bands in the frequency range of interest. Still other modifications of the invention are possible and may be made by those skilled in the art to which it pertains without departing from its scope and spirit.

What is claimed is:

1. Apparatus adapted for the stimulated emission of radiation in the infrared portion of the optical spectrum comprising means for containing a gaseous active medium, means defining a low-loss infrared beam path through said containing means, a gaseous mixture disposed within said containing means and comprising an active gas selected from the group consisting of krypton, xenon and radon and an auxiliary gas comprising helium and having a higher ionization potential than said active gas and having all of its metastable energy states disposed to prevent energy transfer therefrom to said active gas, the ratio of said auxiliary gas to said active gas being at least 50:1, said active gas having an energy level system characterized by at least one metastable excited state with a large cross section for excitation by electron impact and at least one relatively short-lived lower excited state, and means for producing a relatively high energy electron discharge in said mixture, a population inversion being produced between said metastable and said lower state of said active gas by electron impact upon atoms of said active gas, and means for abstracting an output from said apparatus.

2. Apparatus as claimed in claim 1 wherein the ratio of helium to the active gas is at least 100:1.

3. Apparatus adapted for the stimulated emission of radiation, comprising means for containing a gaseous active medium, means defining a low-loss light beam path through said containing means, a gaseous mixture disposed within said containing means and comprising an active gas selected from the group consisting of krypton, xenon and radon and helium as an auxiliary gas present in a ratio to said active gas of at least 50:1, said active gas having an energy level system characterized by a plurality of closely spaced upper metastable states and at least one lower state with a relatively short lifetime, the separations between said upper states and said lower state corresponding to wavelengths in the optical range of interest, the ground state of said active gas having a large cross-section for electron impact excitation to said upper metastable states, said auxiliary gas having a higher ionization potential than said active gas and having all of its metastable excited states substantially removed from levels than can couple energy to the active gas metastables, means for exciting an electron discharge through said gaseous medium, the free electrons of said discharge undergoing elastic collisions with the particles of said auxiliary gas more often than inelastic collisions with particles of said active gas whereby the effective temperature of the discharge is increased and preferential excitation of said upper metastable states occurs, and means for abstracting a light beam from said medium.

References Cited by the Examiner

FOREIGN PATENTS 608,711    3/1962    Belgium.

OTHER REFERENCES

Patel et al.: "Infrared Spectroscopy Using Stimulated Emission Techniques," Physical Review Letters, vol. 9, No. 3, Aug. 1, 1962, pp. 102–104.

JEWELL H. PEDERSEN, *Primary Examiner.*

L. ORLOFF, R. L. WIBERT, *Assistant Examiners.*